United States Patent
Pesta et al.

[11] Patent Number: 6,149,242
[45] Date of Patent: Nov. 21, 2000

[54] SEAT BELT BUCKLE PRETENSIONER MOUNTING MECHANISM

[75] Inventors: Christopher J. Pesta, Sterling Heights; Matthew E. Dukatz, Bloomfield Hills; William Mar, Clinton Township, all of Mich.

[73] Assignee: DaimlerChrysler Corporation, Auburn Hills, Mich.

[21] Appl. No.: 09/294,285

[22] Filed: Apr. 19, 1999

[51] Int. Cl.[7] .............................. A47C 31/00; B60R 22/46
[52] U.S. Cl. ...................... 297/480; 297/463.1; 280/806
[58] Field of Search ............................... 297/480, 463.1, 297/463.2; 280/806

[56] References Cited

U.S. PATENT DOCUMENTS

| | | | |
|---|---|---|---|
| 4,913,497 | 4/1990 | Knabel et al. ........................ | 297/480 |
| 5,149,134 | 9/1992 | Föhl ..................................... | 280/806 |
| 5,288,105 | 2/1994 | Ikegaya et al. ..................... | 297/480 |
| 5,299,830 | 4/1994 | Hanna et al. ....................... | 280/806 |
| 5,403,037 | 4/1995 | Föhl ..................................... | 280/806 |
| 5,639,120 | 6/1997 | Kmiec et al. ....................... | 280/806 |
| 5,676,397 | 10/1997 | Bauer ................................. | 297/480 |
| 5,887,897 | 3/1999 | Gill et al. ........................... | 297/480 |
| 6,039,353 | 3/2000 | Bauer et al. ....................... | 297/480 |

*Primary Examiner*—Anthony D. Barfield
*Attorney, Agent, or Firm*—Lawrence J. Shurupoff

[57] ABSTRACT

An automotive seat belt buckle pretensioner is economically mounted on a seat structure with a bracket structure that includes a first major wall securable to an available mounting surface, a second major wall offset horizontally from the first wall mounting the operating components of the pretensioner, and a horizontal connector wall joining the first and second major walls. The bracket can be reconfigured to meet different mounting surface availabilities and installation space requirements.

7 Claims, 1 Drawing Sheet

SEAT BELT BUCKLE PRETENSIONER MOUNTING MECHANISM

BACKGROUND AND SUMMARY OF THE INVENTION

The invention relates to an automotive seat belt buckle pretensioner, and particularly to a mounting mechanism for a seat belt buckle pretensioner. The invention is especially applicable to seat belt pretensioners that employ pyrotechnic cartridges as the power source.

Seat belt buckle pretensioners employing explosive pyrotechnic gas generators as the power source are shown in U.S. Pat. No. 5,403,037 and U.S. Pat. No. 5,639,120. Typically, a seat belt buckle pretensioner includes a pyrotechnic cartridge mounted in a housing that is suitably affixed to a concealed portion of the automotive seat structure. A cylinder extends from the housing for slidably supporting a small piston that is operatively connected to the seat belt buckle by a flexible cable.

Should the automotive vehicle experience an abrupt deceleration, a sensor causes an electrical signal to be delivered to the pyrotechnic cartridge, which explosively generates a relatively high gas pressure against the piston. The piston slides rapidly along the cylinder to exert a pulling force on the cable; the cable draws the seat belt buckle angularly downwardly to tension the associated seat belt.

In many cases there may be only a relatively small space within the automotive seat structure for operatively mounting the seat belt buckle pretensioner. The present invention relates to a mounting mechanism for a seat belt buckle pretensioner that is separate from the pretensioner componentry, whereby the mounting mechanism can be designed to fit different installation space requirements without requiring any redesign of the pretensioner components.

In preferred practice of the invention the mounting mechanism includes a single bracket, stamped or otherwise formed, so that one wall of the bracket is attachable to the available mounting surface underneath the seat structure, while another wall of the bracket serves as a mounting device for the operating componentry of the seat belt buckle pretensioner. The single bracket can be reconfigured to meet different installation space requirements.

Further features of the invention will be apparent from the attached drawings and description of an illustrative embodiment of the invention.

BRIEF DESCRIPTION OF THE DRAWINGS

FIG. 1 is taken on line 1—1 in FIG. 2.

DESCRIPTION OF A PREFERRED EMBODIMENT OF THE INVENTION

Figure 1:
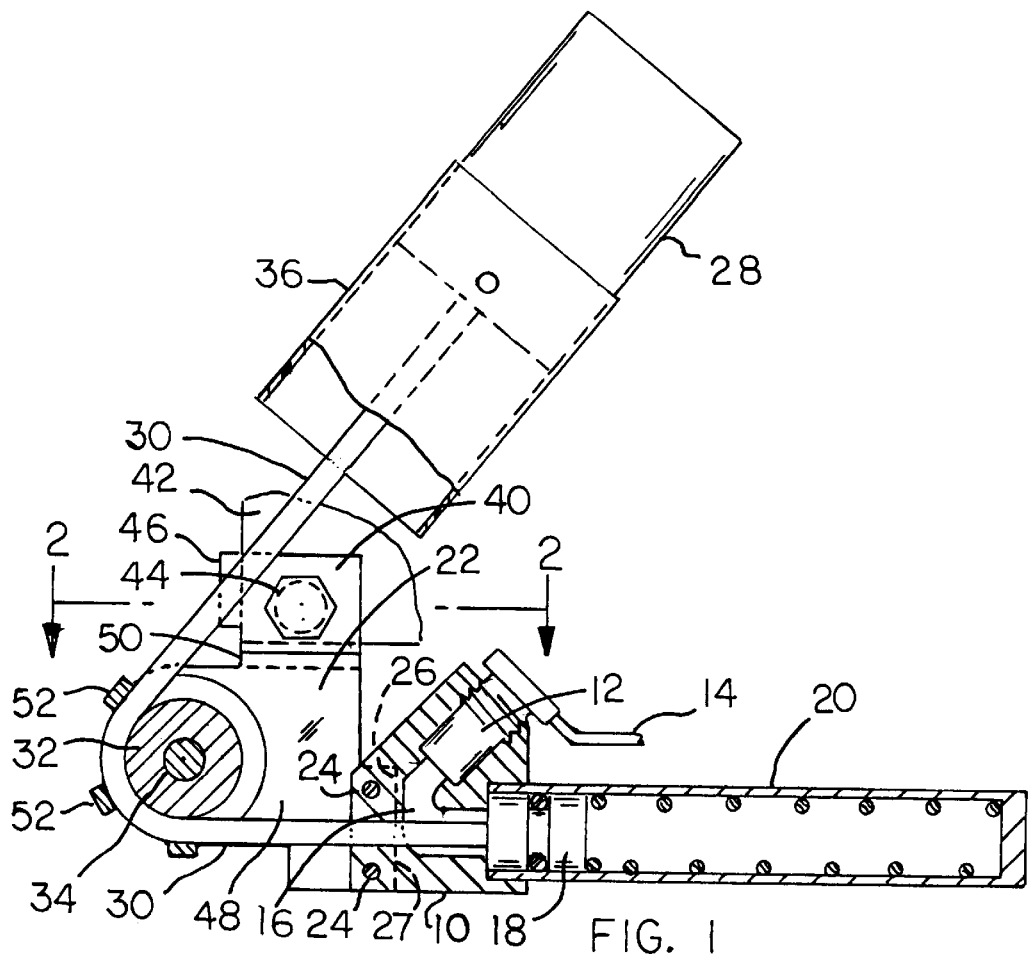
FIG. 1 is a sectional view of a seat belt buckle pretensioner assembly embodying the invention.
Figure 2:
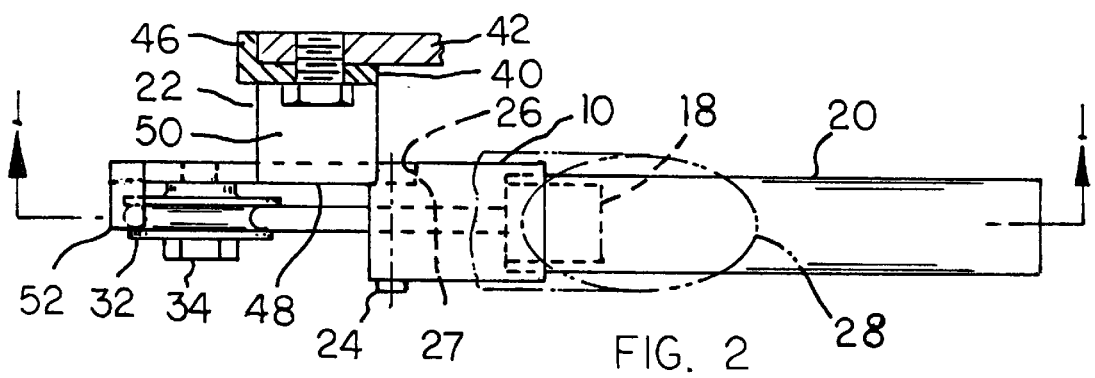
FIG. 2 is a view taken on line 2—2 in FIG. 1.

The drawings show an automotive seat belt buckle pretensioner assembly adapted for installation within the structure of an automotive seat, not shown. The operating componentry used in the pretensioner assembly is generally conventional. The invention relates particularly to the mounting mechanism for the pretensioner.

As shown, the seat belt buckle pretensioner includes a housing 10 that supports a pyrotechnic gas generator cartridge 12 having a lead wire 14. When an electrical signal is delivered through lead wire 14 to the cartridge, the explosive mixture in the cartridge generates a high gas pressure that is channeled through passage 16 against the left face of a piston 18 that is slidably supported in an elongated cylinder 20 extending rightwardly from housing 10. Piston 18 moves rapidly within cylinder 20 in a left-to-right direction.

Housing 10 is affixed to a mounting bracket 22 by two screws 24 extending transversely through the housing into threaded holes in the bracket. Housing 10 has an external shoulder 26 that mates with edge 27 of bracket 22, so as to augment the mounting force of screws 24.

Shoulder 26 is oriented to absorb the force on the housing associated with the explosive generation of gas by cartridge 12. As depicted in FIG. 1, the explosive force is directed within passage 16 downwardly and leftwardly at an angle of approximately forty five degrees to the horizontal. Shoulder 26 on housing 10 is oriented to absorb the explosive force. Screws 24 are used primarily to keep housing 10 in a fixed position on bracket 22. The shoulder 26 on the housing abuts the associated edge of bracket 22 to handle the explosive force.

A belt buckle 28 of conventional construction is operatively connected to piston 18 by a flexible cable 30. As shown in FIG. 1, cable 30 extends angularly downwardly from the belt buckle around a grooved pulley 32 and then horizontally to a fixed connection with piston 18. Pulley 32 is rotatably mounted on bracket 22 by a bolt 34. The threaded shank of the bolt threads into a threaded hole in the bracket. Left-to-right motion of piston 18 produces an oblique downward motion of buckle 28, with a consequent tensioning of the associated seat belt.

As an optional feature, a frangible breakable sleeve 36 may be telescopically attached to buckle 28 to conceal cable 30, and to prevent external objects from coming in contact with the cable.

The invention relates particularly to the construction of mounting bracket 22. The bracket includes a first major wall 40 seatable against an available wall structure 42 that forms part of the supporting structure for the automotive seat. A threaded hole is formed in wall structure 42 to receive the threaded end of a mounting bolt 44 that extends through a smooth-surfaced mounting hole in bracket wall 40. In order to position the mounting bracket against inadvertent rotation around the bolt 44 axis, wall 40 has a flange 46 thereon adapted to engage an edge of stationary wall structure 42. Flange 46 enables the mounting bracket 22 to be affixed to wall structure 42 with a single mounting hole and single mounting bolt 44.

Mounting bracket 22 further includes a second major wall 48 oriented in a vertical plane offset horizontally from the plane of wall 40, so that buckle 28 can move downwardly along the plane of cable 30 without striking the mounting bracket. Bracket wall 48 is connected to wall 40 by a horizontal connector wall 50. Pulley 32 and housing 10 are affixed to bracket wall 48.

As an optional feature, bracket 22 has multiple tabs 52 extending right angularly from wall 48 along the peripheral edge of pulley 32, to prevent inadvertent separation of cable 30 from the pulley. Bracket 22 is preferably formed out of a single metal plate, suitably stamped or formed, to have the desired configuration.

It will be noted that the operating components 10, 20, 18, and 32 are separate from bracket 22. The bracket can be configured (or reconfigured) to meet different installation space requirements and mounting surface availabilities without necessitating redesign of the operating componentry. This is advantageous from a manufacturing point of view, in that a standard proven operating system can be used on a range of different automotive vehicles (and model years) merely by varying the mounting bracket geometry.

What is claimed:

1. An automotive seat belt buckle pretensioner assembly comprising:

a mounting bracket that includes a first major wall oriented in a first vertical plane, a second major wall oriented in a second vertical plane, and a connector wall joining said first and second major walls, whereby the major walls are offset;

a seat belt buckle;

a pyrotechnic power means mounted on said second major wall of the mounting bracket;

a pulley mounted on said second major wall of the mounting bracket;

a cable extending from said buckle around said pulley to said pyrotechnic power means;

said first major wall having means thereon for attaching the bracket to an automotive seat structure.

2. The pretensioner assembly of claim 1, wherein said attaching means comprises a single attachment hole extending through said first major wall.

3. The pretensioner assembly of claim 1, wherein said attaching means comprises a single attachment hole extending through said first major wall;

said first major wall having a bracket positioner flange extending away from the plane of said second major wall.

4. The pretensioner assembly of claim 1, wherein said connector wall extends horizontally normal to the First and second major walls; said attaching means comprising a single attachment hole extending through said first major wall in the space above said connector wall; said first major wall having a bracket positioner flange extending away from the plane of said second major wall.

5. The pretensioner assembly of claim 4, wherein said pyrotechnic power means comprises a housing attached to the second major wall of said bracket and an explosive pyrotechnic cartridge mounted in said housing; said housing having an external shoulder; said second major wall having an edge abutting said external shoulder; said shoulder being oriented to absorb an explosion force generated by the pyrotechnic cartridge.

6. An automotive seat belt buckle pretensioner assembly comprising;

a mounting bracket that includes a first major wall having a single mounting hole for attaching the bracket to an automotive seat structure, and a second major wall oriented in a vertical plane so as to be offset from the first major wall;

a seat belt buckle;

a pyrotechnic power means mounted on said second major wall of the mounting bracket;

a pulley mounted on said second major wall in a common plane with said power means; and a cable extending from said buckle around said pulley to said pyrotechnic power means.

7. The pretensioner assembly of claim 6, wherein said pyrotechnic power means comprises a housing attached to said second major wall, an explosive pyrotechnic cartridge mounted in said housing; said housing having an external shoulder; said second major wall having an edge abutting said external shoulder; a shoulder explosive force generated by the pyrotechnic cartridge.

* * * * *